United States Patent [19]

Hay

[11] Patent Number: 5,639,849

[45] Date of Patent: Jun. 17, 1997

[54] POLYMERIC PHTHALOCYANINES AND PRECURSORS THEREFOR

[76] Inventor: Allan S. Hay, 5015 Glencairn Avenue, Montreal, Quebec, Canada, H3W 2B3

[21] Appl. No.: 613,446

[22] Filed: Mar. 1, 1996

Related U.S. Application Data

[62] Division of Ser. No. 395,718, Feb. 28, 1995, Pat. No. 5,545,832, which is a division of Ser. No. 296,148, Jul. 26, 1994, Pat. No. 5,430,124, which is a division of Ser. No. 50,813, Apr. 21, 1993, Pat. No. 5,369,203.

[51] Int. Cl.$^6$ .................. C08G 65/40; C08G 65/38; G03G 15/02; G03G 15/08
[52] U.S. Cl. .................. 528/211; 528/208; 528/217; 430/58; 430/93; 430/311; 430/319; 526/300
[58] Field of Search .................. 528/211, 208, 528/217; 526/300; 430/58, 93, 311, 319

[56] References Cited

U.S. PATENT DOCUMENTS

| 5,369,203 | 11/1994 | Hay | 528/211 |
| 5,430,124 | 7/1995 | Hay | 528/211 |

*Primary Examiner*—Samuel A. Acquah
*Assistant Examiner*—P. Hampton-Hightower
*Attorney, Agent, or Firm*—Swabey Ogilvy Renault

[57] ABSTRACT

Novel fumaronitriles and dicyanophenanthrenes, for example, bis(4-fluorophenyl)fumaronitrile and 3,6-difluoro-9,10-dicyanophenanthrene which can be produced from the fumaronitrile, produce useful homopolymers and copolymers for high temperature applications; the homopolymers and copolymers derived from the dicyanophenanthrenes can be converted to colored phthalocyanine group-containing polymers which are soluble in organic solvents and can be cast as films which may form the charge generating layer of an electrophotography device.

11 Claims, No Drawings

POLYMERIC PHTHALOCYANINES AND PRECURSORS THEREFOR

CROSS-REFERENCE TO RELATED APPLICATIONS

This Application is a Division of U.S. Ser. No. 08/395, 718, filed Feb. 28, 1995, now U.S. Pat. No. 5,545,832, issued Aug. 13, 1996; which is a Division of U.S. Ser. No. 08/296,148, filed Jul. 26, 1994, now U.S. Pat. No. 5,430, 124, issued Jul. 4, 1995; which is a Division of U.S. Ser. No. 08/050,813, filed Apr. 21, 1993, now U.S. Pat. No. 5,369, 203, issued Nov. 29, 1994.

BACKGROUND OF THE INVENTION

1. Field of the Invention

This invention relates to novel polymers and copolymers and novel monomers which introduce useful characteristics into such polymers and copolymers; in particular the invention is concerned with novel cyano-substituted stilbenes, which provide thermal crosslinking characteristics in polymers and copolymers; cyano-substituted phenanthrenes-containing polymers and copolymers which are high temperature polymers; and coloured phthalocyanine-containing polymers and copolymers for use in charge generation layers in electrophotography, including xerography and in laser printing.

2. Brief Description of Prior Art

Advanced composite materials are made from combinations of high performance fibers, such as glass, graphite, carbon, silicon carbide or ceramic fibers, arranged in close packed alignment in the polymer as a matrix. Such composite materials provide a combination of strength and modulus superior to that of structural metals and alloys on an equal weight basis. Such composites are, for example, employed in military and commercial aircraft, and space vehicles, as well as in sports equipment, in tennis racquets, shafts for golf clubs and sailboats.

These composite materials are expensive, and so their use is confined to relatively high cost items. On the other hand, even though the raw materials for these advanced composites are expensive, over 70% of the costs associated with such composites result from the processing costs for their manufacture.

In particular, the currently used manufacturing process produce volatiles during curing of the polymer matrix and such volatiles produce voids in the matrix which act as sites for structural failure. In order to minimize void formation during evolution of volatiles, the cure must be carried out over a long period, under reduced pressure and this manufacturing requirement is a major factor in the production cost.

There is thus a continuing need for curable polymers and copolymers.

The most well known curing reaction involving cyano groups is the use of polyacrylonitrile fiber as a precursor in the production of carbon fibers. Heating between 200°–300° C. in air crosslinks the polymer to a form in which it is insoluble in organic solvents, and infusible; and this crosslinked fiber is graphitized at high temperature.

Polymers containing phthalonitrile groups on the ends of the chains can be cured to insoluble resins when heated to elevated temperatures, as described in U.S. Pat. Nos. 5,132, 396 and 5,159,054.

Phthalocyanines are known as pigments, dyes or colouring agents, as described in High-Technology Applications of Organic Colorants, Peter Gregory, Plenum Press; for example, their use has been described or proposed in solar cells and in charge generating layers in electrophotography. In these proposals, however, the phthalocyanine colorants are dispersed in a polymeric binder, for example, a polycarbonate.

SUMMARY OF THE INVENTION

It is an object of this invention to provide new curable polymers and copolymers and novel cyano-substituted stilbene monomers for their production.

It is another object of this invention to provide new polymers and copolymers and novel cyano-substituted phenanthrene monomers for their production.

It is a still further object of this invention to provide coloured phthalocyanine-containing polymers for use in charge generation layers in electrophotography, including xerography and in laser printing.

It is yet another object of this invention to provide processes for the preparation of the aforementioned novel monomers, polymers and copolymers.

In accordance with one aspect of the invention there is provided a fumaronitrile of formula (I)

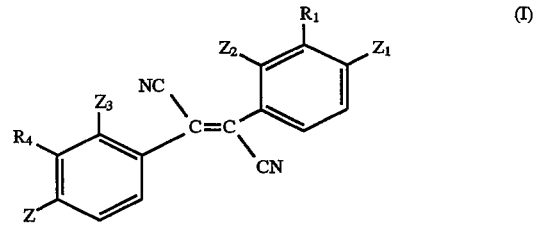

wherein Z is F or H and $Z_3$ is F or $R_3$, provided that one, and only one, of Z and $Z_3$ is F; $Z_1$ is F or H and $Z_2$ is F or $R_2$, provided that one, and only one of $Z_1$ and $Z_2$ is F; $R_1$, $R_2$, $R_3$ and $R_4$, which may be the same or different, are selected from hydrogen, chloro, bromo, cyano, lower alkyl of 1 to 6 carbon atoms, aryl of 6 to 10 carbon atoms or hetaryl.

Preferably Z and $Z_1$ are both F and at least one of $R_1$ and $R_2$ and at least one of $R_3$ and $R_4$ are hydrogen, more preferably $R_1$, $R_2$, $R_3$ and $R_4$ are all hydrogen.

In accordance with another aspect of the invention there is provided a dicyanophenanthrene of formula (II)

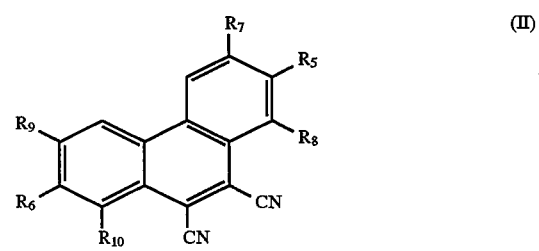

wherein $R_5$ and $R_6$, which may be the same or different, are selected from hydrogen, chloro, bromo, cyano, lower alkyl of 1 to 6 carbon atoms, aryl of 6 to 10 carbon atoms or hetaryl; one of $R_7$ and $R_8$ is F and the other is H and one of $R_9$ and $R_{10}$ is F and the other is H. Preferably $R_7$ and $R_9$ are F and $R_8$ and $R_{10}$ are H.

In accordance with still another aspect of the invention there is provided a fumaronitrile group-containing homopolymer or copolymer containing units of formula (III)

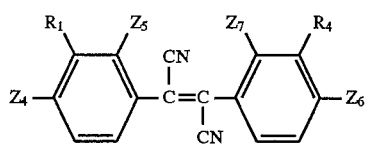
(III)

wherein $Z_4$ is H or an ether linkage —O— and $Z_5$ is $R_2$ or an ether linkage —O—, provided that one, and only one, of $Z_4$ and $Z_5$ is an ether linkage —O—;

$Z_6$ is H or a linkage —O—Ar— and $Z_7$ is $R_3$ or a linkage —O—Ar—, provided that one, and only one, of $Z_5$ and $Z_6$ is a linkage —O—Ar—, $R_1$, $R_2$, $R_3$ and $R_4$ are as defined hereinbefore and Ar is a divalent aromatic linkage.

In a preferred embodiment the units are of formula (IIIA)

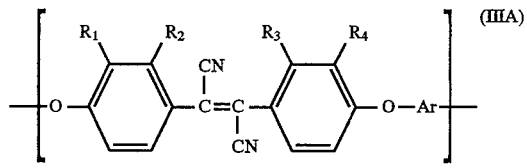
(IIIA)

wherein $R_1$, $R_2$, $R_3$, $R_4$ and Ar are as defined hereinbefore.

In accordance with yet another aspect of the invention there is provided a dicyanophenanthrene group-containing homopolymer or copolymer containing units of formula (IV)

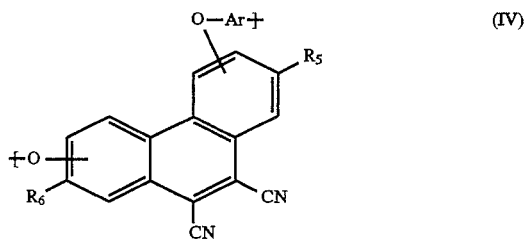
(IV)

wherein $R_5$ and $R_6$ are as defined hereinbefore and Ar is a divalent aromatic linkage.

The ether linkages may be in the 1- or 3-position and the 6- or 8-position respectively.

In a preferred embodiment the ether linkages are at the 3- and 6- position such that the units are of formula (IVA)

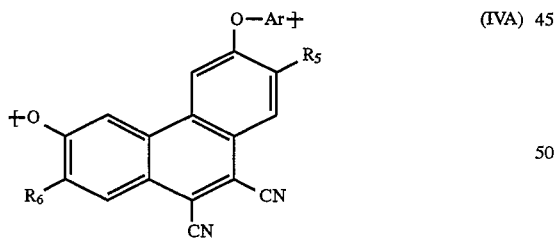
(IVA)

In yet another aspect of the invention there is provided a phthalocyanine group containing homopolymer or copolymer containing units of formula (V)

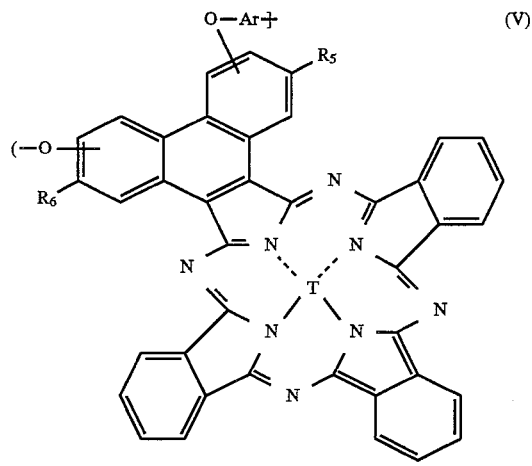
(V)

wherein $R_5$ and $R_6$ are as defined hereinbefore, Ar is a divalent aromatic linkage, and T represents a metal ion M or a pair of hydrogen atoms completing the valency of the non-imino N atoms.

The ether linkages may be in the 1- or 3-position and the 6- or 8-position, respectively.

In a preferred embodiment the ether linkages are in the 3 and 6-positions such that the units are of formula (VA)

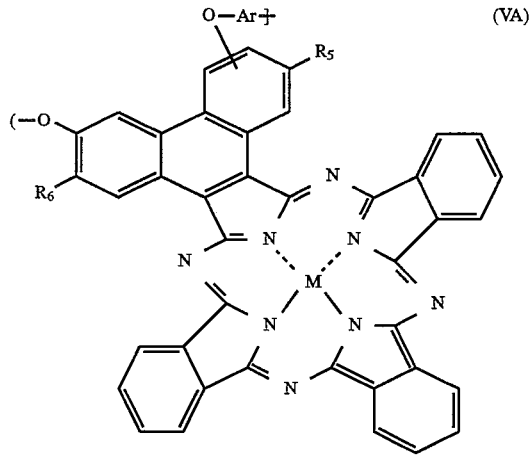
(VA)

wherein M is the metal ion.

When T represents the pair of hydrogen atoms the units are of formula (VB)

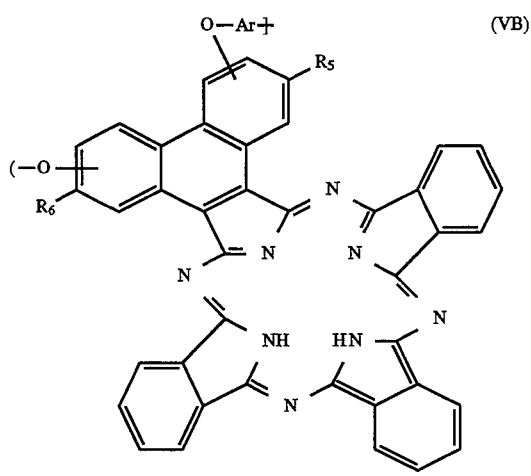 (VB)

In still another aspect of the invention there is provided a charge generation layer of an electrophotography device which comprises a film of a phthalocyanine group-containing homopolymer or copolymer of the invention.

In particular, in an electrophotography device which comprises a substrate, a charge generating layer and a charge transport layer, the charge generating layer is a film of a phthalocyanine group-containing homopolymer or copolymer of the invention.

DESCRIPTION OF PREFERRED EMBODIMENTS a) Fumaronitriles

The fumaronitriles of formula (I), as defined hereinbefore may be produced by reacting the appropriate 4-fluorobenzyl cyanides of formula (VI)

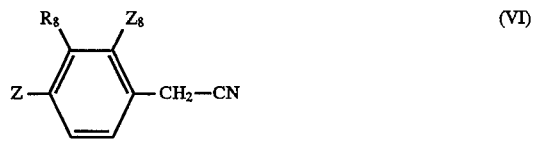 (VI)

in which Z is F or H and $Z_8$ is F or $R_9$, provided that one, and only one, of Z and $Z_8$ is F, $R_8$ is selected from $R_1$ and $R_4$ and $R_9$ is selected from $R_2$ and $R_4$ as defined hereinbefore, with an alkali metal hydroxide and carbon tetrachloride, suitably the alkali metal hydroxide is an aqueous solution of sodium hydroxide, and a phase transfer catalyst, for example, trimethylbenzylammonium chloride is employed.

In a preferred embodiment Z is F and at least one and preferably both of $R_8$ and $Z_8$ are hydrogen.

It will be understood that mixtures of cyanides (VI) may be employed to produce fumaronitriles (I) in which $R_3$ and $R_4$ are different from $R_1$ and $R_2$.

In formula (I), $R_1$, $R_2$, $R_3$ and $R_4$ are preferably all hydrogen.

The alkyl radicals in the definition of $R_1$, $R_2$, $R_3$ and $R_4$ preferably have 1 to 4 carbon atoms, and the aryl radicals are preferably phenyl or naphthyl; the hetaryl radicals are, in particular, pyridyl, thiazolyl, thiadiazolyl, benzimidazolyl, benzotriazolyl or triazolyl.

The fumaronitriles (I) may be employed to produce the dicyanophenanthrenes (II) or the fumaronitrile group containing homopolymers or copolymers containing units of formula (III) as defined hereinbefore.

b) Dicyanophenanthrenes

The dicyanophenanthrenes of formula (II), as defined hereinbefore, are produced from the corresponding fumaronitriles (I) by exposing the fumaronitriles (I) to ultra-violet light and oxygen.

In formula (II) $R_5$ and $R_6$ are preferably hydrogen. The alkyl radical in the definition of $R_5$ and $R_6$ preferably have 1 to 4 carbon atoms and the aryl radicals are preferably phenyl or naphthyl; the hetaryl radicals are, in particular, pyridyl, thiazolyl, thiadiazolyl, benzimidazolyl, benzotriazolyl or triazolyl.

c) Homopolymers and Copolymers

The homopolymers and copolymers produced from the fumaronitriles (I) and the dicyano-phenanthrenes (II), respectively, are produced by the same general process.

The homopolymers are produced by reacting the monomer (I) or (II) with an aromatic diol, for example, bisphenol A in equimolar proportions. This reaction suitably proceeds in a dipolar aprotic solvent in the presence of potassium carbonate.

The conditions for this type of polymerization are well established.

Suitable aromatic diols are those of formula (VII)

HO—Ar—OH (VII)

in which Ar is selected from

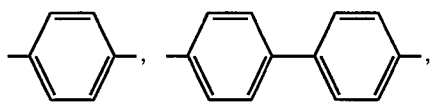

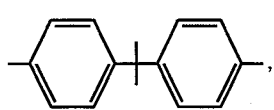

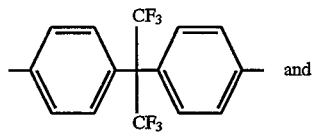 and

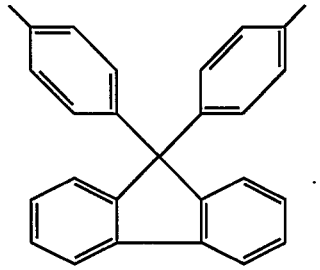

The copolymers may be poly(ether sulfone)s, poly(ether ketone)s, poly(phthalazine)s, poly(iso-quinoline)s or poly (imido aryl ether)s.

The copolymers are produced following the procedure described for the homopolymers, but replacing a portion of the monomer (I) or (II) by a desired comonomer.

Suitable comonomers include those of formulae (VIII), (IX), (X), (XI) and (XII) below

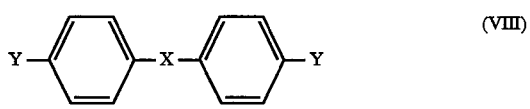 (VIII)

in which X is —CO— or —SO$_2$—, and Y is halogen, especially fluorine, chlorine or bromine;

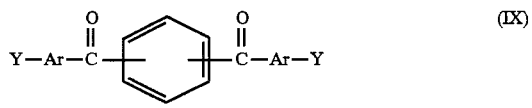

(IX)

in which Y is halogen, especially fluorine, chlorine or bromine; Ar is an arylene radical, for example, phenylene, which may be unsubstituted or substituted and the —CO groups are preferably in the 1,2-, 1,3- or 1,4-positions.

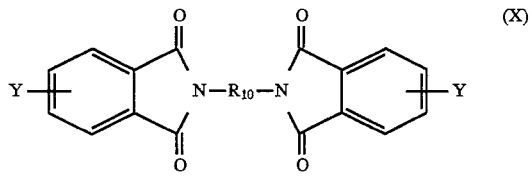

(X)

in which $R_{10}$ is an aromatic hydrocarbon radical or aromatic hydrocarbon ether radical having 6 to 20 carbon atoms and Y is nitro or halogen, especially fluorine, chlorine or bromine,

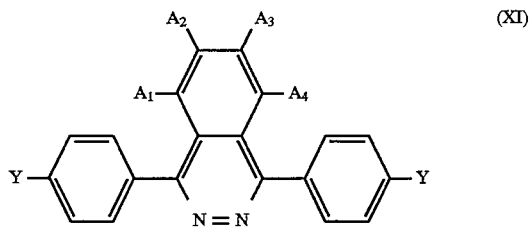

(XI)

wherein $A_1$, $A_2$, $A_3$ and $A_4$ are selected from hydrogen and aryl groups, for example, phenyl or naphthyl and each Y is fluorine, or

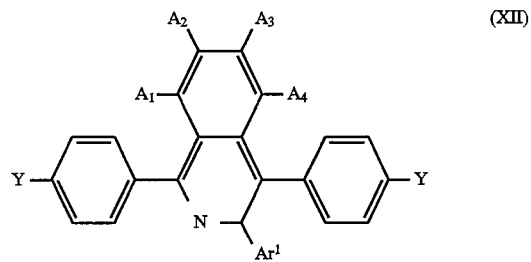

(XII)

wherein $A_1$, $A_2$, $A_3$ and $A_4$ are selected from hydrogen and aryl groups, for example, phenyl or naphthyl, each Y is fluorine and $Ar^1$ is aryl, for example, phenyl or naphthyl.

The poly(phthalazines and the poly(isoquino-line)s can be produced from the corresponding ketones by reaction with hydrazine or benzylamine, respectively.

The homopolymers and copolymers containing the units of formula (III) as described hereinbefore, and thus containing the cyano-substituted stilbene groups, crosslink when heated thereby curing the polymers and rendering them insoluble and increasing the temperature at which they may be employed.

The homopolymers and copolymers containing the units of formula (IV), as described hereinbefore, and thus containing the dicyanophenanthrene groups are high temperature polymers which do not cross-link on heating and are useful for high temperature applications.

The production of homopolymers containing units (III) and (IV), respectively, from bis(4-fluorophenyl) fumaronitrile is illustrated in Scheme (I) below

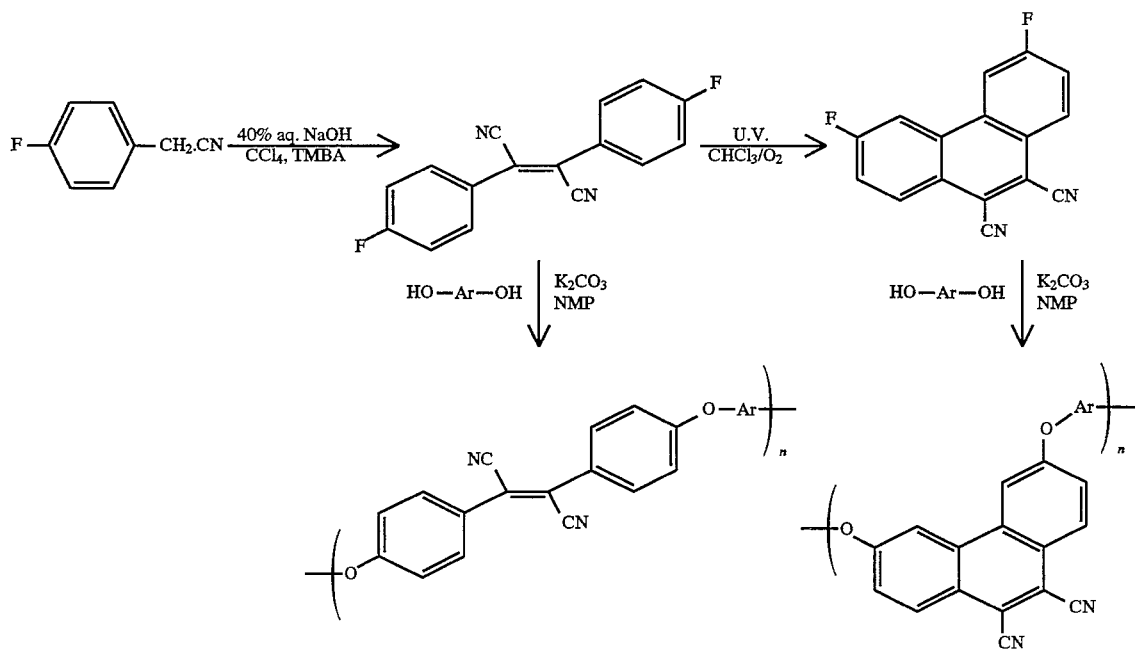

d) Phthalocyanine-containing Homopolymers or Copolymers

The phthalocyanine-containing homopolymers and copolymers are produced from the corresponding homopolymers or copolymers containing units of formula (IV) by reaction with a metal halide:

$$MY^1$$

in which M is the metal ion and $Y^1$ is a halide ion especially fluoride, chloride or bromide, and 1,2-cyanobenzene, suitably in quinoline as solvent for the homopolymer or copolymer containing units of formula (IV), at an elevated temperature of about 200° C.

The production of copolymers in which M is Cu from 3,6-difluoro-9,10-dicyanophenanthrene is illustrated in Scheme (II) below:

$R_5$ and $R_6$ in the unit of formula (V) are preferably both hydrogen. The lower alkyl in $R_5$ and $R_6$ preferably have 1 to 4 carbon atoms, and the aryl radicals are preferably phenyl or naphthyl; the hetaryl radicals are, in particular, pyridyl, thiazolyl, thiadiazolyl, benzimidazolyl, benzotriazolyl or triazolyl.

The metal ion M is preferably Cu, but other metals may be employed including Ag, Au, Li, Na, K, Be, Mg, Ca, Al, Zn, Sc, Ti, V, Cr, Mn, Ga, Ge, Si, Se, Mo, W, Tc, Re, Sn, Pb, Zr, Hf, In, Tl, Cd, Ba, Hg, Fe, Co, Ni, Ru, Rh, Pd, Cs, Ir, Pt, the Lanthanides and the Actinides.

The homopolymers and copolymers of the invention containing the phthalocyanine unit in the polymer chain produce coloured polymers which are soluble in organic solvents. Thus in the case where M is Cu, the polymers are an intense green in colour and are soluble in organic solvents such that tough, thin, green polymer films can be cast from solutions of them in such solvents. These films are more

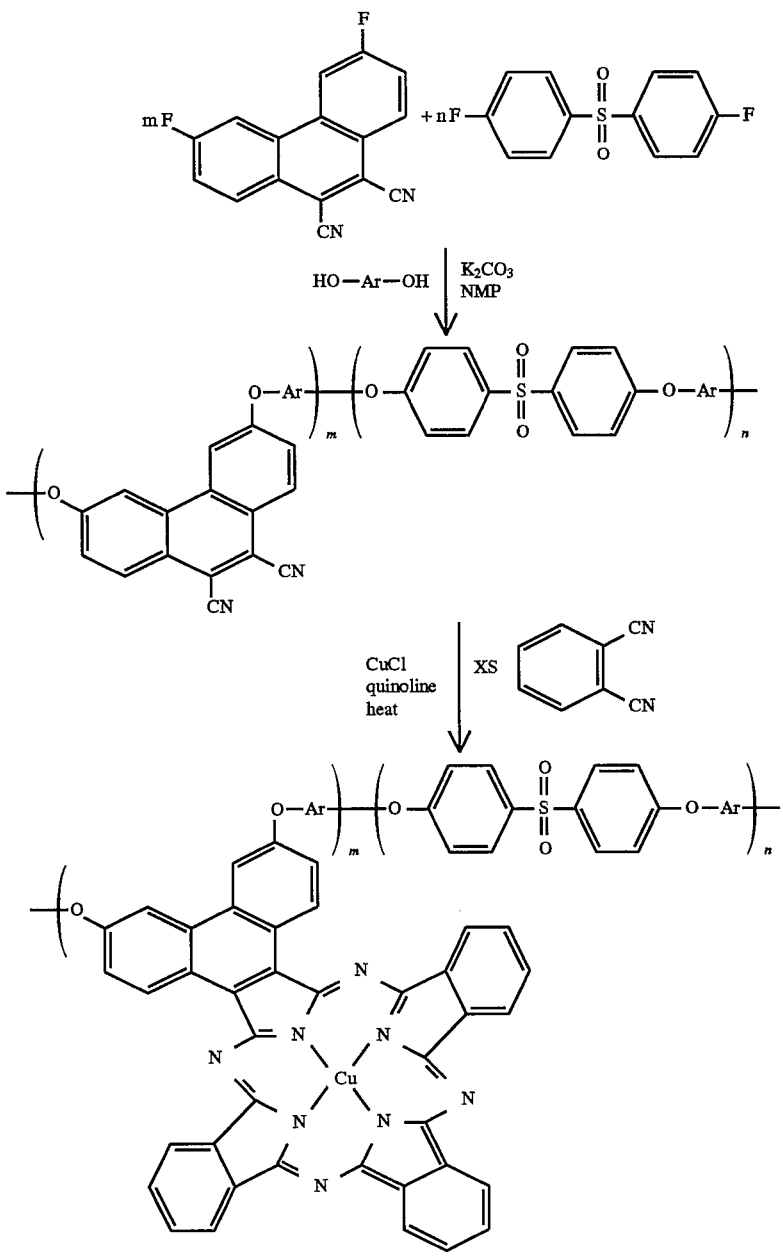

homogeneous in character than the prior dispersions of phthalocyanines in polymer matrices.

Films of these coloured polymers can thus be cast from solution to produce the charge generation layer in electrophotography devices:

It will be understood that the copolymers containing units (III), (IV) or (V) may be generally represented by

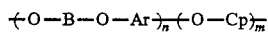

in which B is the fumaronitrile, dicyanophenanthrene or phthalocyanine unit, Cp is the comonomer unit and m and n are integers which define the relative proportions of B and Cp in the copolymer, m+n is suitably an integer of 2 to 200, preferably 10 to 100.

Considerable variation is permissible in the relative proportions of B and Cp, although since B is the unit of main interest, usually n>m, especially for m+n<50.

The homopolymers and copolymers of the invention containing the phthalocyanine unit in the polymer chain may also be employed in other compositions and devices in which porphyrin and like structures have been employed, for example, solar cells and other applications as described in High-Technology Applications of Organic Colorants, Peter Gregory, 1991 Plenum Press, the teachings of which with respect to the applications of porphyrin and like structures are incorporated herein by reference.

The benzene nuclei in the compounds (I), (II) and (VI), and in the units (III), (IV) and (V) may be replaced by other aromatic nuclei in particular naphthyl and anthracyl nuclei, by way of example there may be mentioned:

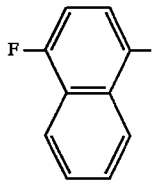

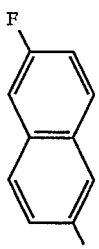

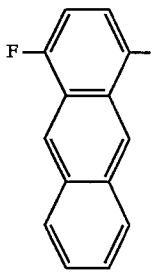

The nuclei all fall within the spirit of the invention.

EXAMPLES

Example 1

Synthesis of 2,3-bis(4-fluorophenyl)-2-butenedinitrile.

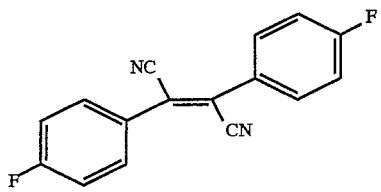

A solution of 4-fluorobenzyl cyanide (30 g; 0.222 mol.) in carbon tetrachloride (100 ml) was added slowly, over a period of 30 minutes, to a rapidly stirring mixture of 40% aqueous sodium hydroxide (100 ml; 1 mol), carbon tetrachloride (100 ml) and trimethylbenzylammonium chloride (TMBA; 0.6 g; 0.003 mol). The mixture was maintained at room temperature overnight, after which time a precipitate had formed which was collected by filtration and washed with water and chloroform. The organic layer of the mother liquor was washed successively with dilute hydrochloric acid, 5% aqueous sodium bicarbonate and water and then dried over magnesium sulphate. The dried solution was filtered and then evaporated to a paste which was triturated with ethanol to give a second crop of product, which was combined with the first. The material was recrystalised form ethanol to yield small white needles. Yield=50%.: m.p. 194°–195° (EtOH); 1H NMR (200 MHz, CDCl3) d 7.17–7.29 (m, 4H), 7.78–7.89 (m, 4H); 13C NMR (50 MHz, DMSO-d6) d 116.74 (d, |J|=22.4 Hz), 116.76 (s), 124.81 (s), 128.59 (d, |J|=3.4Hz), 131.73 (d, |J|=9.1 Hz), 163.87 (d, |J|=250.6 Hz); MS (EI) m/e 266 (100, M+•); Analysis calc'd for C16H8N2F2: C, 72.17; H, 3.03; N, 10.52; found: C, 71.98; H, 2.80; N, 10.48.

Example 2

Synthesis of 3,6-difluoro-9,10-dicyanophenanthrene.

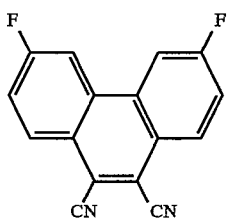

A solution of 2,3-bis-(4-fluorophenyl)-2-butene dinitrile, in chloroform (20 g/l), was placed in a photochemical reaction vessel fitted with a water cooled quartz immersion well, a water condenser and a gas inlet needle. The mixture was irradiated with a medium pressure mercury lamp, for a period of 2–3 weeks, 8 hours per day. At the beginning of each day the reaction mixture was sparged with oxygen for 15 minutes. The reaction was monitored using HPLC and it was stopped when the product peak ceased to increase. Throughout the irradiation the mixture was maintained at room temperature by means of an external cooling bath. The whole apparatus was enclosed in a box as a protection against U.V radiation.

At the end of the reaction the mixture was evaporated to dryness and the solid recrystalised to constant melting point from acetone to give very fine beige needles. : mp 297° C. (Acetone); 1H NMR (200 MHz, DMSO-d6) d 7.84 (m, 2H), 8.21 (m, 2H), 8.76 (m, 2H); 13C NMR (50 MHz, DMSO-d6) d 110.65 (d, |J|=24.1), 115.20 (s), 119.79 (d, |J|=24.8), 124.31 (s), 130.09 (d, |J|=10.1), 163.68 (d, |J|=251.4); MS (EI) m/e 264 (100, M+•); Analysis calcd for: C16H6F2N2 C, 72.73; H, 2.29; N, 10.60; found: C, 72.67; H, 1.88; N, 10.66.

All of the polymerization reactions were carried out according to the following procedure.

by adding the mixture dropwise to methanol/water (4:1:200 ml). Beads of polymer formed which were recovered by filtration, dried in air and redissolved in chloroform (20 ml). The chloroform solution was filtered through a plug of Celite (Trade Mark) and again precipitated in methanol/water. A fibrous, yellow polymer was obtained and filtered and dried in vacuum at 75 C. for 24 h.

| | R | Solvent | Inherent viscosity | Tg °C. | Tg °C. (cured*) | Typical yield = 75%. |
|---|---|---|---|---|---|---|
| Example 3 | A | DMAc | 0.60 | 159 | 183 | |
| Example 4 | B | DMAc | 0.27 | 259 | 261 | |
| Example 5 | C | DMAc | 0.39 | 164 | 187 | |
| Example 6 | D | DMAc | 0.41 | 192 | 221 | |
| Example 7 | E | sulfolane | 0.48 | 179 | 191 | |

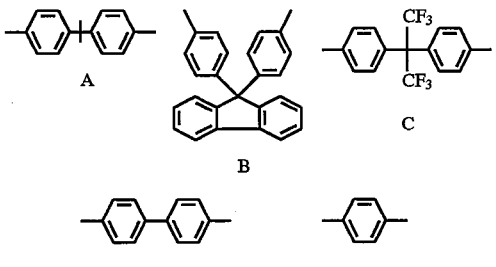

*cured 300° C. for 30 minutes

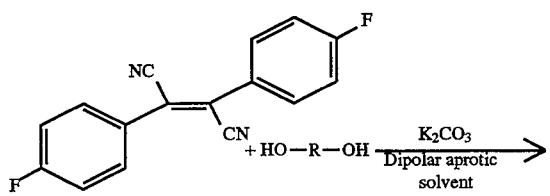

Example 3

2,3-Bis-(4-fluorophenyl)-2-butene dinitrile (1.0000 g; 0.00376 mol) and bisphenol A (0.8574 g; 0.00376 mol) were carefully weighed, accurate to 4 decimal places and transferred to a 50 ml, 3-neck r.b. flask, together with potassium carbonate (0.675; 0.00488 mol). Any material that became stuck to the mouth of the flask or the weighing paper was washed into the flask using the solvents, DMAC (10 ml) and toluene (5 ml). The flask was fitted with a Dean Stark trap filled with toluene and refluxed for 3 hrs (reflux temp.=135° C.). The Dean Stark trap was then drained of toluene and any water that had co-distilled, and the remaining toluene in the flask was allowed to distill over. The reaction temperature then increased to 160° C. and after 1–3 h the viscosity of the mixture increased dramatically and the reaction was stopped When the polymers are heated an exothermic reaction takes place and the polymers become insoluble. A $^{13}$C NMR solid state analysis of the polymer of Example 3 before and after curing shows that the CN group in the original polymer disappears during the curing reaction.

The dicyanophenanthrene monomer of Example 2 was converted to a polymer according to the procedure of Example 3.

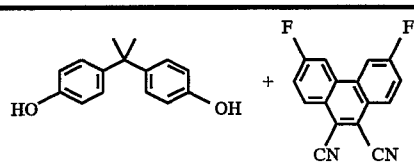

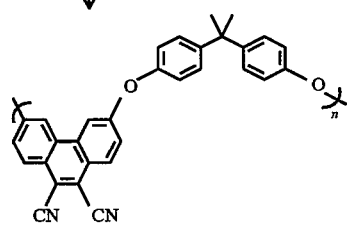

| | $\eta_{inh}$ | Tg °C. | TGA N2* | TGA (air)* |
|---|---|---|---|---|
| Example 8 | 0.33 | 250 | 492 | 495 |

*5% weight loss in TGA

Polysulfone copolymers were prepared according to the following Examples.

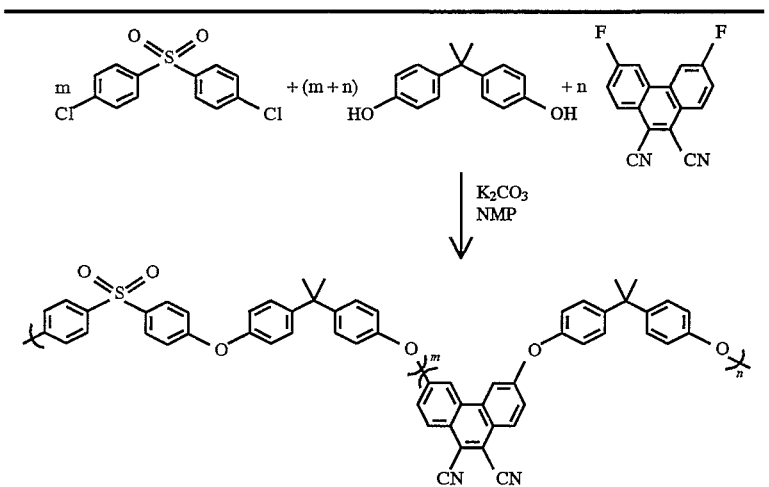
| | % Phenanthrene | Tg °C. | TGA(N$_2$)* °C. | $\eta_{inh}$ |
|---|---|---|---|---|
| Example 9 | 10 | 195 | 470 | 0.40 |
| Example 10 | 20 | 200 | 467 | 0.42 |
| Example 11 | 30 | 206 | 439 | 0.30 |
*5% weight loss in TGA
The preparation of phthalocyanine containing-polymers was carried out according to the following procedure.
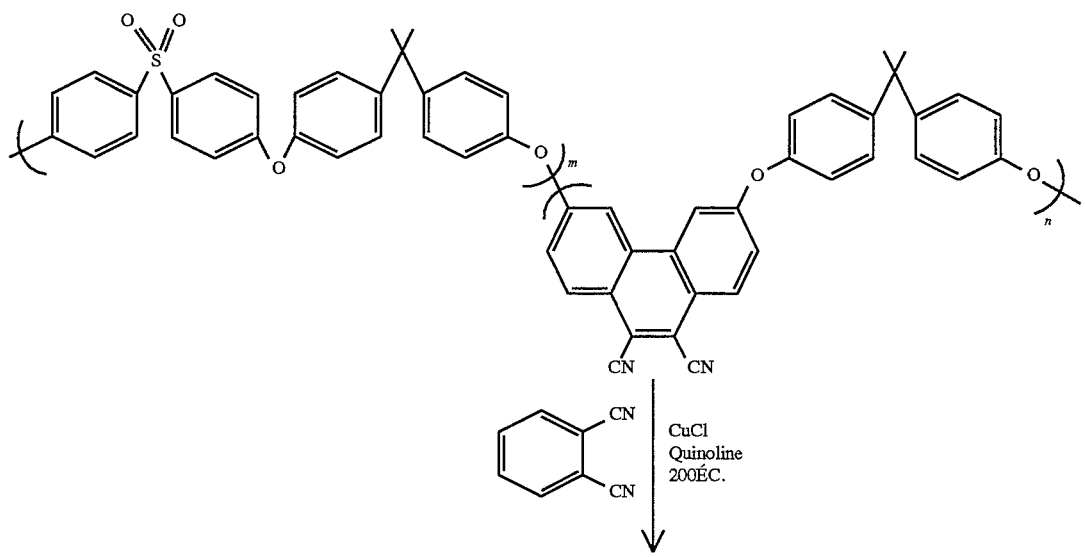

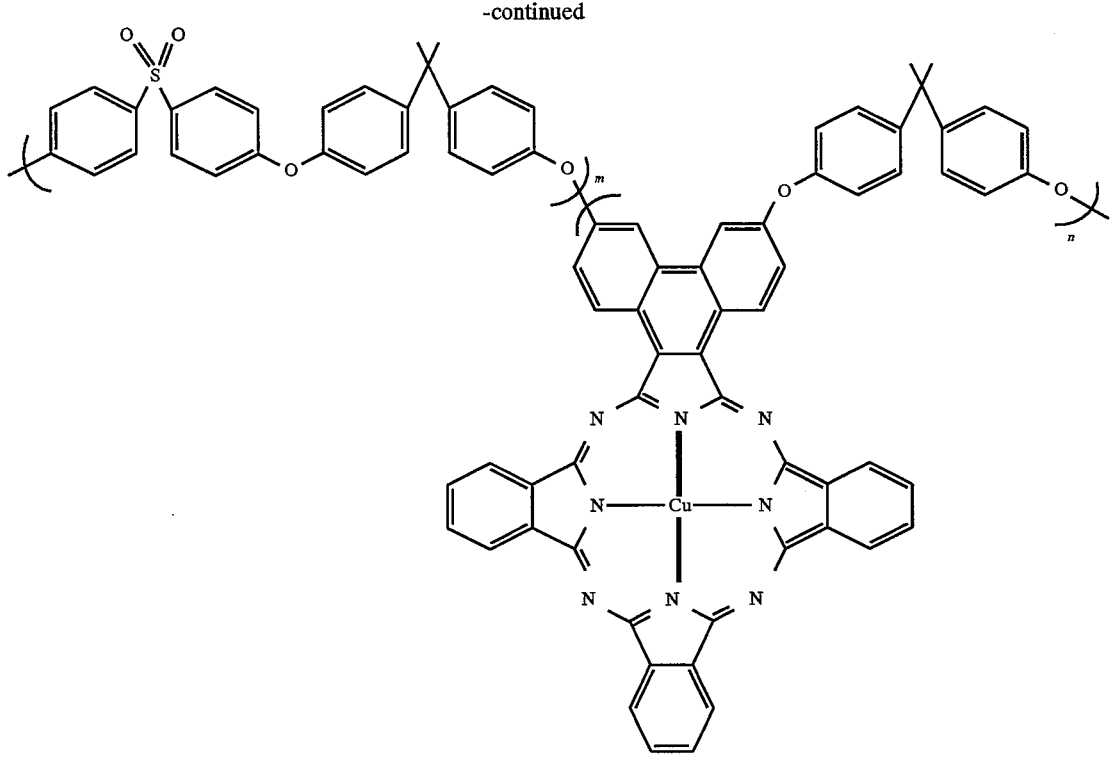

Example 12

A copolymer containing the 9,10-dicyanophenanthrene moiety (0.8 g) was dissolved in quinoline (10–20ml). For each equivalent of the dicyanophenanthrene moiety, 40 equivalents of 1,2-dicyanobenzene were added along with 20 equivalents of cuprous chloride. The mixture was warmed to 200° C. whereupon a vigorous exothermic reaction ensued. After 1 hr the exotherm had subsided and the reaction was cooled and the mixture added dropwise to methanol, to yield black beads. The beads were purified by redissolving in chloroform, filtering through celite, and reprecipitating into methanol to yield green fibrous polymer which was dried in the oven at 75° C.

Typical yield=75%.

|  | % Phthalocyanine | Tg °C. | TGA(N₂)* °C. | $\eta_{inh}$ |
|---|---|---|---|---|
| Example 12 | 10 | 199 | 470 | 0.41 |
| Example 13 | 20 | 201 | 478 | 0.34 |
| Example 14 | 30 | 202 | 482 | 0.34 |

*5% weight loss in TGA

The UV-Visible spectrum shows the strong absorption characteristics of phthalocyanines. X-ray diffraction shows that the polymers are semi-crystalline.

I claim:

1. A charge generation layer of an electrophotography device comprising a film of a phthalocyanine group-containing homopolymer or copolymer containing units of formula (V)

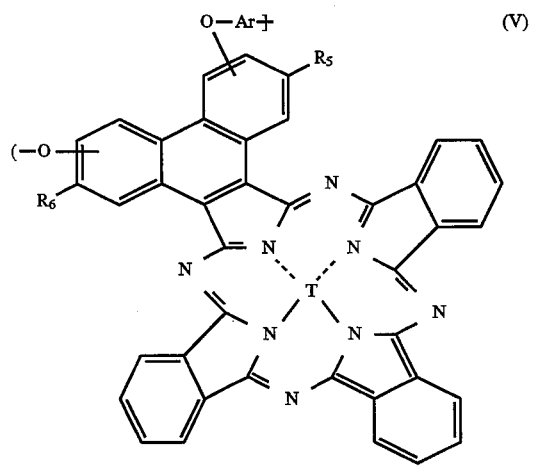

(V)

wherein $R_5$ and $R_6$, which may be the same or different, are selected from hydrogen, chloro, bromo, cyano, lower alkyl of 1 to 6 carbon atoms, aryl of 6 to 10 carbon atoms, pyridyl, thiazolyl, thiadiazolyl, benzimidazolyl, benzotriazolyl or triazolyl, Ar is a divalent aromatic linkage, and T represents a metal ion M or a pair of hydrogen atoms completing the valency of the non-imino N. atoms.

2. A charge generation layer according to claim 1, wherein $R_5$ and $R_6$ are both hydrogen, and Ar is selected from

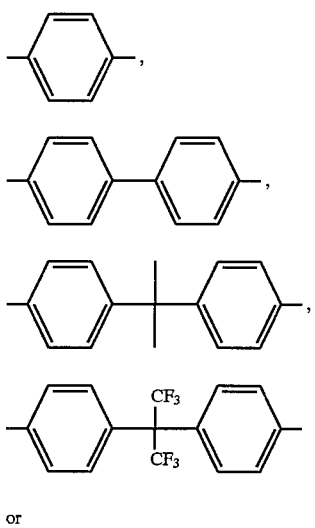

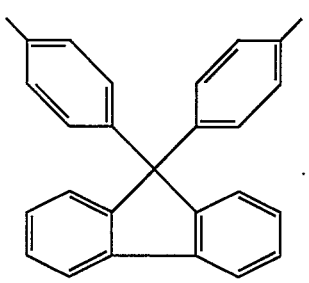

or

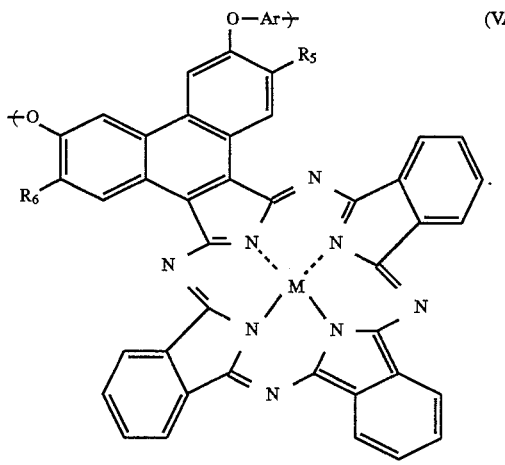

3. A charge generation layer according to claim 2, wherein T is the metal ion M.

4. A charge generation layer according to claim 2, wherein T represents a pair of hydrogen atoms.

5. A charge generation layer according to claim 1, in which said units of formula (V) are of formula (VA):

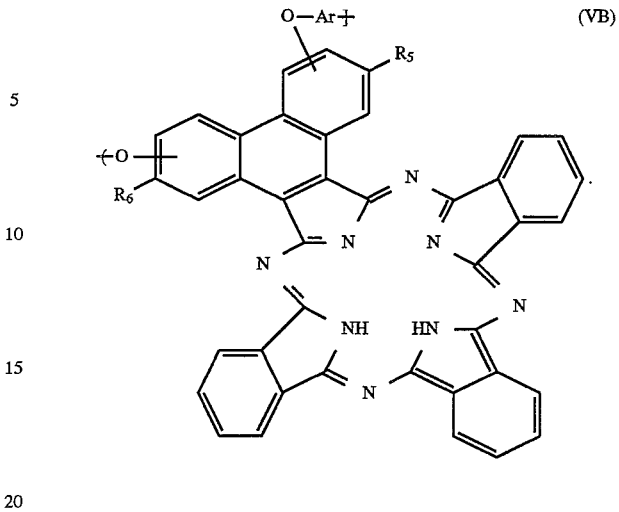

6. A charge generation layer according to claim 1, in which said units of formula (V) are of formula (VB):

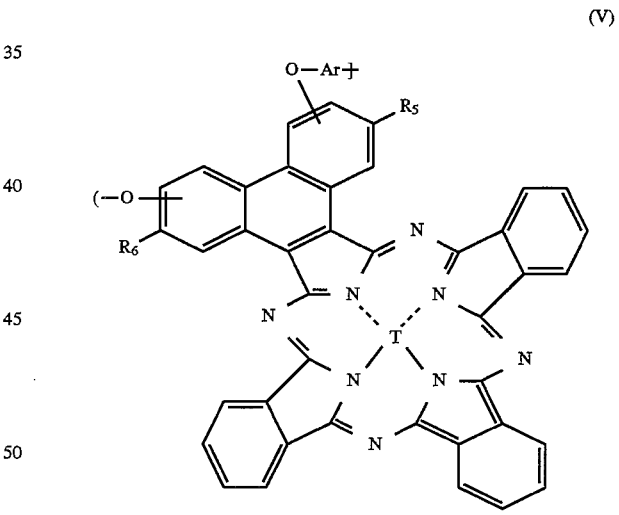

7. A charge generation layer according to claim 1, wherein $R_5$ and $R_6$ are both hydrogen.

8. A charge generation layer according to claim 2, wherein $R_5$ and $R_6$ are both hydrogen.

9. In an electrophotography device comprising a substrate, a charge generating layer and a charge transport layer the improvement wherein said charge generating layer is a film of a phthalocyanine group-containing homopolymer or copolymer containing units of formula (V)

wherein $R_5$ and $R_6$, which may be the same or different, are selected from hydrogen, chloro, bromo, cyano, lower alkyl of 1 to 6 carbon atoms, aryl of 6 to 10 carbon atoms, pyridyl, thiazolyl, thiadiazolyl, benzimidazolyl, benzotriazolyl or triazolyl, Ar is a divalent aromatic linkage, and T represents a metal ion M or a pair of hydrogen atoms completing the valency of the non-imino N atoms.

10. In an electrophotography device comprising a substrate, a charge generating layer and a charge transport layer according to claim 9, the improvement wherein $R_5$ and $R_6$ are both hydrogen, and Ar is selected from

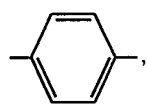,
,
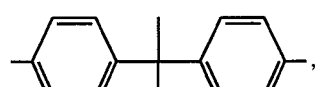,
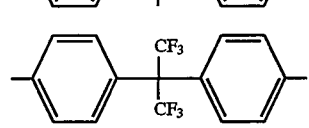
or
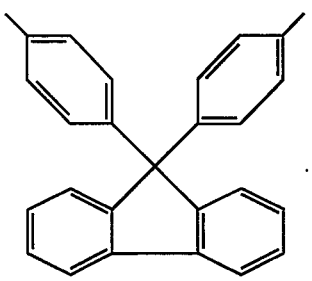
11. In an electrophotography device comprising a substrate, a charge generating layer and a charge transport layer according to claim 10, the improvement wherein T is the metal ion M.
* * * * *